United States Patent
Nakae et al.

(10) Patent No.: US 9,288,233 B2
(45) Date of Patent: Mar. 15, 2016

(54) COMMUNICATION CONTROL APPARATUS, COMMUNICATION CONTROL METHOD, AND PROGRAM

(75) Inventors: Masayuki Nakae, Tokyo (JP); Masaya Yamagata, Tokyo (JP); Yoichiro Morita, Tokyo (JP); Hideyuki Shimonishi, Tokyo (JP); Kentaro Sonoda, Tokyo (JP)

(73) Assignee: NEC Corporation, Tokyo (JP)

( * ) Notice: Subject to any disclaimer, the term of this patent is extended or adjusted under 35 U.S.C. 154(b) by 129 days.

(21) Appl. No.: 14/126,744

(22) PCT Filed: Jun. 15, 2012

(86) PCT No.: PCT/JP2012/065387
§ 371 (c)(1),
(2), (4) Date: Dec. 16, 2013

(87) PCT Pub. No.: WO2012/173234
PCT Pub. Date: Dec. 20, 2012

(65) Prior Publication Data
US 2014/0123215 A1    May 1, 2014

(30) Foreign Application Priority Data

Jun. 17, 2011  (JP) .................................. 2011-134995

(51) Int. Cl.
*H04L 29/06*       (2006.01)
*H04L 12/911*      (2013.01)
(Continued)

(52) U.S. Cl.
CPC .............. *H04L 63/20* (2013.01); *H04L 45/125* (2013.01); *H04L 47/70* (2013.01)

(58) Field of Classification Search
None
See application file for complete search history.

(56) References Cited

U.S. PATENT DOCUMENTS

2006/0136722 A1    6/2006  Ogura et al.
2007/0074281 A1*   3/2007  Ikeda ...................... H04L 67/24
                                                              726/13
(Continued)

FOREIGN PATENT DOCUMENTS

JP          10-154118         6/1998
JP          2001-244974       9/2001
(Continued)

OTHER PUBLICATIONS

International Search Report corresponding to PCT/JP2012/065387, dated Aug. 27, 2012, 5 pages.
(Continued)

*Primary Examiner* — Dede Zecher
*Assistant Examiner* — Trang Doan
(74) *Attorney, Agent, or Firm* — Wilmer Cutler Pickering Hale and Dorr LLP

(57) ABSTRACT

A communication control apparatus controls communication between a first apparatus and a second apparatus connected to the first apparatus via a plurality of relay apparatuses. The communication control apparatus comprises: a communication path generation unit that refers to a control policy including access control and supplementary control that is other than the access control from the first apparatus to the second apparatus and refers to network configuration information about a network configuration among the first apparatus, the second apparatus, and the plurality of relay apparatuses and generates a communication path that matches the control policy from the first apparatus to the second apparatus and goes through at least one of the plurality of relay apparatuses; and a communication path control unit that instructs a relay apparatus(es) on the communication path among the plurality of relay apparatuses to execute the access control and the supplementary control included in the control policy.

13 Claims, 12 Drawing Sheets

(51) Int. Cl.
*H04L 12/729* (2013.01)
*G06F 15/16* (2006.01)
*G06F 17/00* (2006.01)
*G06F 15/173* (2006.01)

(56) References Cited

U.S. PATENT DOCUMENTS

| | | | |
|---|---|---|---|
| 2007/0157307 A1* | 7/2007 | Katoh | H04L 63/105 |
| | | | 726/14 |
| 2008/0262990 A1 | 10/2008 | Kapoor et al. | |
| 2009/0183252 A1* | 7/2009 | Nomi | H04L 63/08 |
| | | | 726/13 |
| 2010/0142435 A1* | 6/2010 | Kim | H04B 7/2606 |
| | | | 370/315 |
| 2011/0040892 A1* | 2/2011 | Amemiya | H04L 67/1027 |
| | | | 709/235 |
| 2011/0235525 A1* | 9/2011 | Nishi | H04L 41/5035 |
| | | | 370/242 |
| 2012/0017262 A1 | 1/2012 | Kapoor et al. | |
| 2012/0044935 A1* | 2/2012 | Hama | H04L 12/4625 |
| | | | 370/389 |
| 2014/0123215 A1* | 5/2014 | Nakae et al. | 726/1 |
| 2014/0247714 A1* | 9/2014 | Sonoda et al. | 370/230 |

FOREIGN PATENT DOCUMENTS

| | | |
|---|---|---|
| JP | 2006-180280 | 7/2006 |
| JP | 2007-184724 | 7/2007 |
| JP | 2007-336220 | 12/2007 |

OTHER PUBLICATIONS

Written Opinion of the International Search Authority corresponding to PCT/JP2012/065387, mailing date Sep. 4, 2012, 4 pages.

Carapinha, J. et al., "Network virtualization—a View from the Bottom," Proceedings of the 1$^{st}$ ACM Workshop on Virtualized Infrastructure Systems and Architectures, New York, New York, 8 pages (Jan. 1, 2009).

Extended European Search Report issued by the European Patent Office for Application No. 12801133.5 dated Mar. 30, 2015 (8 pages).

* cited by examiner

FIG. 6

SETTING OF DISTRIBUTION SCHEDULE

SCHEDULE LIST

| | POLICY NAME | DISTRIBUTION TIME |
|---|---|---|
| ● | KEIRI WEB | 2011 / 03 / 28 02 :00 :00 |
| ○ | EIGYOU-BU REMOTE USER | 2011 / 03 / 28 02 :00 :00 |
| ○ | KAIHATSU-BU INTERNET USE | NOT SET |
| ○ | | |
| ○ | | |
| ○ | | |
| ○ | | |
| ○ | | |

DETAILED SCHEDULE SETTING

POLICY NAME [KEIRI WEB] [BROWSE]

DISTRIBUTION TIME [2011 / 03 / 28] [02] : [00] : [00]

[SET] [CLEAR]

FIG. 8

| ID OF RELAY APPARATUS | ACCESS SOURCE DOMAIN | ACCESS TARGET DOMAIN | PROTOCOL | COMMAND TO RELAY APPARATUS | ID OF RELAY APPARATUS AS PACKET FORWARDING DESTINATION |
|---|---|---|---|---|---|
| FW1 | TOKYO | KEIRI_WEB | HTTP | ADD_FILTER | SSL1 |
| SSL1 | TOKYO | KEIRI_WEB | HTTP | DECRYPT | LOG1 |
| LOG1 | TOKYO | KEIRI_WEB | HTTP | REC_ALL_PACKETS | KEIRI_WEB_GW |
| KEIRI_WEB_GW | TOKYO | KEIRI_WEB | HTTP | (null) | (null) |

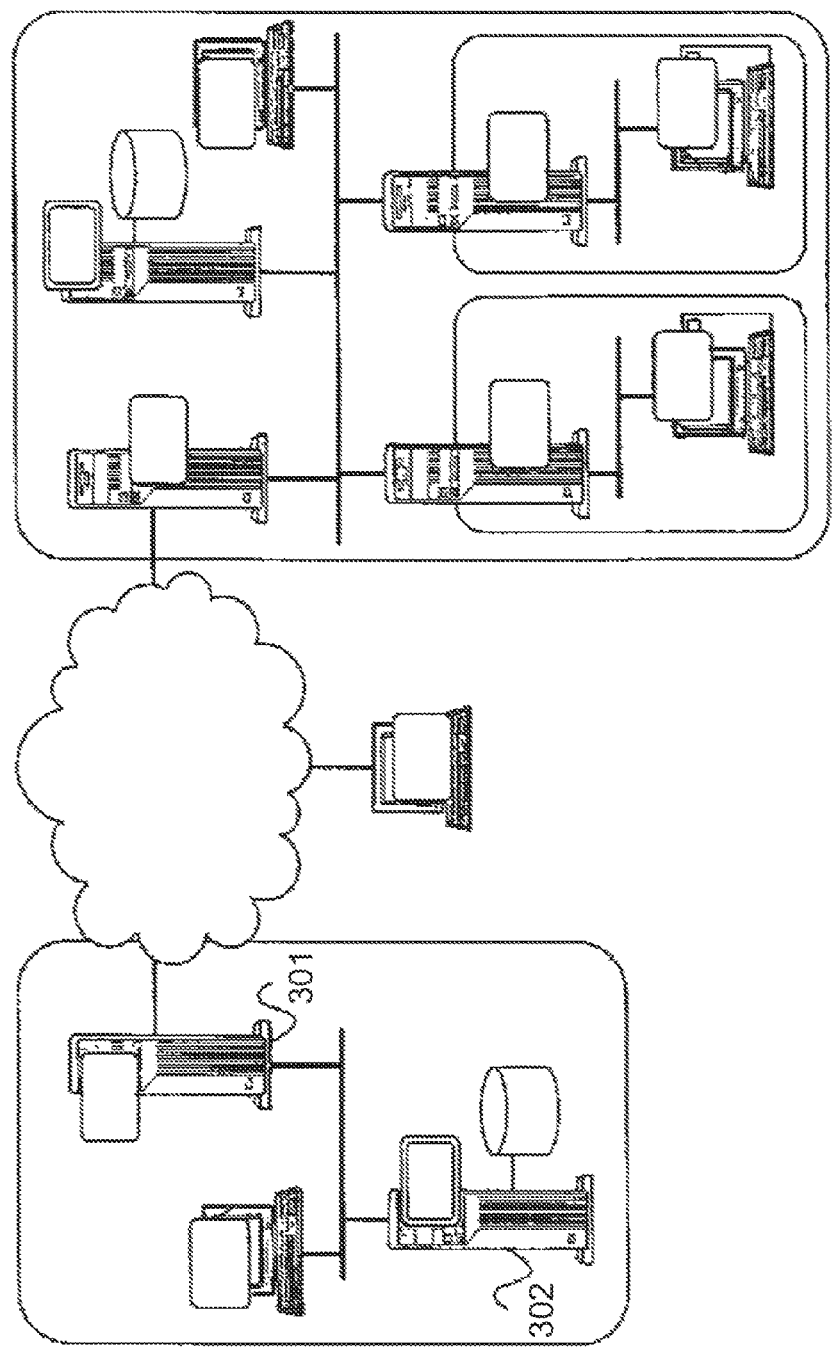
FIG. 10 --RELATED ART--

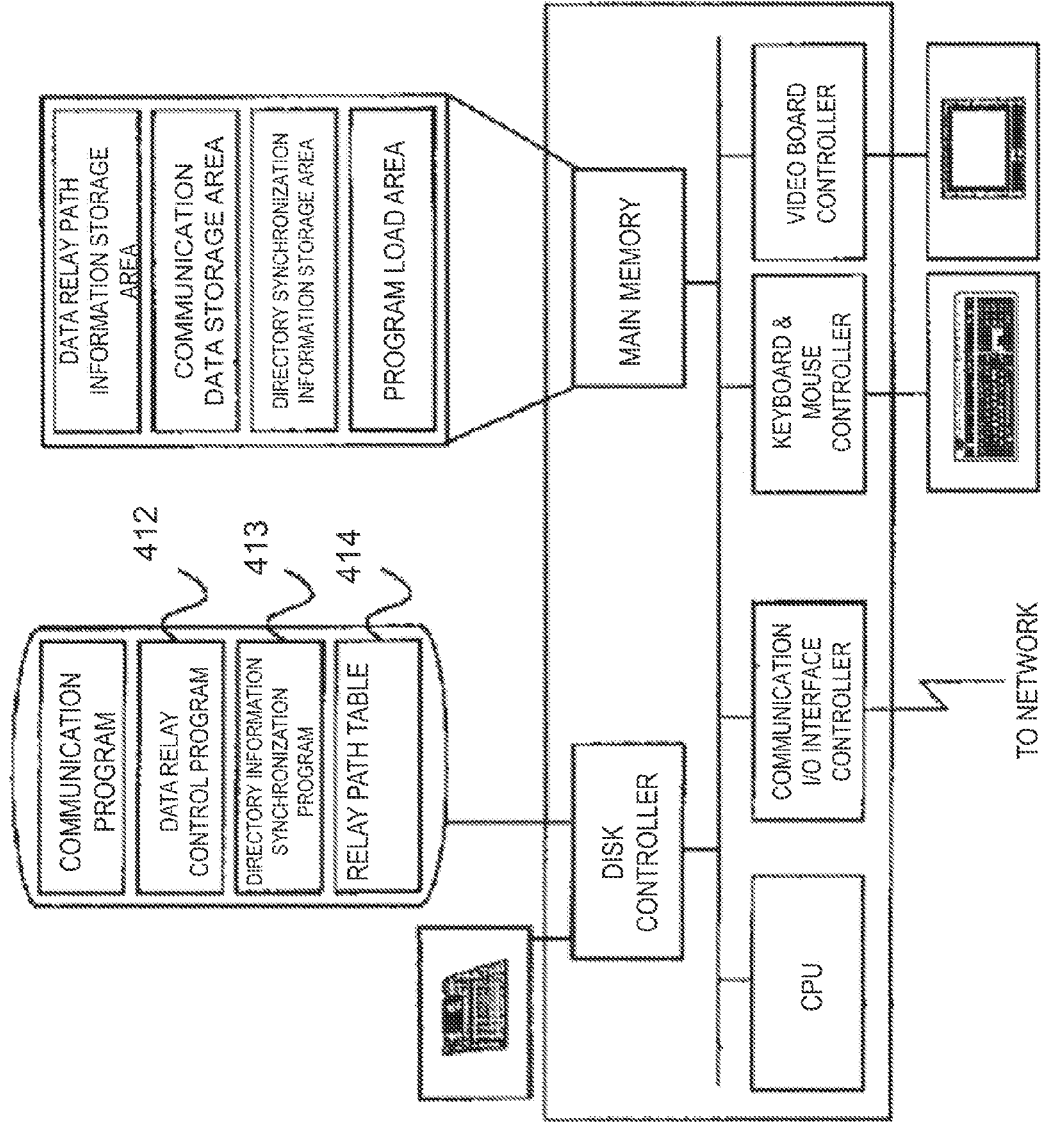
FIG. 11 --RELATED ART--

FIG. 12 --RELATED ART--

| ObjID | Root | Root | Type | AttrID |
|---|---|---|---|---|
| 0000 | Root | | Top | None |
| 0001 | NetworkA | Root | Container | A0001 |
| 0002 | Firewall1 | NetworkA.Root | Service | A0002 |
| 0003 | AliasOfFirewall2 | NetworkA.Root | Alias | A0003 |
| 0004 | DBServer1 | NetworkA.Root | Service | A0004 |
| 0005 | SubnetB | NetworkA.Root | Container | A0005 |
| 0006 | User1 | SubnetB.NetworkA.Root | User | A0006 |
| 0007 | User2 | SubnetB.NetworkA.Root | User | A0007 |
| 0008 | Group2 | SubnetB.NetworkA.Root | Group | A0008 |
| 0009 | Firewall2 | SubnetB.NetworkA.Root | Service | A0009 |
| 0010 | Server1 | SubnetB.NetworkA.Root | Service | A0010 |
| | | . | | |
| n | UserM | SubnetC.NetworkA.Root | User | A000n |

COMMUNICATION CONTROL APPARATUS, COMMUNICATION CONTROL METHOD, AND PROGRAM

REFERENCE TO RELATED APPLICATION

This application is a national stage application of International Patent Application No. PCT/JP2012065387, filed on Jun. 15, 2012 which claims the benefit of the priority of Japanese patent application No. 2011-134995, filed on Jun. 17, 2011, the disclosures of which are incorporated herein in their entirety by reference thereto.

TECHNICAL FIELD

The present invention relates to a communication control apparatus, a communication control method, and a program. In particular, it relates to a communication control apparatus, a communication control method, and a program capable of describing abstract access control information based on user attribute information and service information and capable of, for example, controlling permission of network communication of arbitrary network switches, monitoring communication content, and converting communication content etc., based on the access control information.

BACKGROUND

A network access control system is disclosed in Patent Literature 1. As illustrated in FIG. 10, the network access control system disclosed in Patent Literature 1 is a network communication system including a firewall server apparatus 301 and a directory server apparatus 302.

As illustrated in FIG. 11, the firewall server apparatus 301 includes a data relay control program 412 controlling communication paths, a relay path table 414 storing communication path information of the corresponding server apparatus, and a directory information synchronization program 413 sharing and synchronizing the communication path information with a plurality of firewall server apparatuses via the directory server apparatus 302.

As described in paragraph 28 of Patent Literature 1, in the network communication system disclosed in Patent Literature 1, each of the firewall server apparatuses 301 distributed in a network controls communication paths in accordance with communication path information (see FIG. 12) stored in a predetermined directory server apparatus 302.

In addition, as described in paragraph 26 of Patent Literature 1, access authority representing "which users can access which network domains" can be set in the directory server apparatus 302, as attributes of communication path information. The network access control system disclosed in Patent Literature 1 refers to such access authority and communication path information to determine and control a different communication path per user.

CITATION LIST

Patent Literature

Patent Literature 1:
Japanese Patent Kokai Publication No. JP-H10-154118A

SUMMARY

The disclosure of Patent Literature 1 given above is incorporated herein by reference thereto. The following analysis has been made by the present inventor.

In recent years, there has been a need for network access control for executing not only access permission control but also supplementary control such as checking of communication data (payload) and storing of communication records.

In the network access control system disclosed in Patent Literature 1, there are disclosed an access control method using firewall server apparatuses and a control method of a communication path between firewall server apparatuses. However, with the system disclosed in Patent Literature 1, it is difficult to execute supplementary control such as checking of payload and storing of communication records, counted as a problem.

To execute the above supplementary control, special network relay apparatuses (an application firewall apparatus, a network logger apparatus, and so forth) are needed, and certain rules need to be set and controlled for processing that is executed by each network relay apparatus. However, in the network configuration information (directory database) disclosed in Patent Literature 1, no setting methods other than for the access authority and the path information controlled by the firewall server apparatuses are described.

To solve the above problem, at least the following means (1) to (3) are necessary:
(1) means for storing rules that are different per relay apparatus type or apparatus;
(2) means for appropriately setting rules for respective relay apparatuses; and
(3) means for generating a communication path including a relay apparatus, so that supplementary control specified based on a user (or a user terminal) or a communication destination server (or a communication destination domain) is executed.

If the network communication system disclosed in Patent Literature 1 is used, means (1) and (2) among the above means can be realized by extending a storage area for setting information referred to as an object attribute in the network configuration information, storing setting information unique to each relay apparatus type or each relay apparatus, and setting the setting information in respective apparatuses.

However, as to means (3), the system disclosed in Patent Literature 1 does not have the concept of supplementary control such as on check rules for IP (Internet Protocol) packet payload and storage of communication records. Namely, Patent Literature 1 does not disclose means for generating a communication path on which supplementary control is executed.

Thus, it is desirable that supplementary control such as on check rules for IP packet payload and storage of communication records be realized by using a network access control system controlling communication based on a combination of a user (or a user terminal) and a communication destination server (or a communication destination domain). In addition, it is desirable that a network relay apparatus executing supplementary control be selected and that a communication path be automatically generated.

Thus, there is a need in the art to be addressed. Namely, when a first apparatus accesses a second apparatus via a relay apparatus, not only access control but also supplementary control other than the access control needs to be executed simultaneously.

According to a first aspect of the present invention, there is provided a communication control apparatus that controls communication between a first apparatus and a second apparatus connected to the first apparatus via a plurality of relay apparatuses. The communication control apparatus comprises: a communication path generation unit that refers to a control policy including access control and supplementary control that is other than the access control from the first apparatus to the second apparatus and refers to network configuration information about a network configuration among the first apparatus, the second apparatus, and the plurality of relay apparatuses and generating a communication path that matches the control policy from the first apparatus to the second apparatus and goes through at least one of the plurality of relay apparatuses; and a communication path control unit that instructs a relay apparatus(es) on the communication path among the plurality of relay apparatuses to execute the access control and the supplementary control included in the control policy.

According to a second aspect of the present invention, there is provided a communication control method, comprising: by a communication control apparatus that controls communication between a first apparatus and a second apparatus connected to the first apparatus via a plurality of relay apparatuses, referring to a control policy including access control and supplementary control that is other than the access control from the first apparatus to the second apparatus and network configuration information about a network configuration among the first apparatus, the second apparatus, and the plurality of relay apparatuses; generating a communication path that matches the control policy from the first apparatus to the second apparatus and goes through at least one of the plurality of relay apparatuses; and instructing a relay apparatus(es) on the communication path among the plurality of relay apparatuses to execute the access control and the supplementary control included in the control policy.

According to a third aspect of the present invention, there is provided a program, causing a computer to execute: referring to a control policy DB that stores a control policy including access control and supplementary control that is other than the access control from a first apparatus to a second apparatus connected to the first apparatus via a plurality of relay apparatuses, and referring to a network configuration DB that stores network configuration information about a network configuration among the first apparatus, the second apparatus, and the plurality of relay apparatuses; generating a communication path that matches the control policy from the first apparatus to the second apparatus and goes through at least one of the plurality of relay apparatuses; and instructing a relay apparatus(es) on the communication path among the plurality of relay apparatuses to execute the access control and the supplementary control included in the control policy.

The program may be recorded in a non-transient computer-readable recording medium.

The present invention provides the following advantage, but not restricted thereto. The communication control apparatus, the communication control method, and the program according to the present invention, when the first apparatus accesses the second apparatus via a relay apparatus, not only access control but also supplementary control other than the access control can be executed simultaneously.

BRIEF DESCRIPTION OF DRAWINGS

FIG. 6 illustrates a control policy distribution schedule editing screen according to the exemplary embodiment.

FIG. 8 illustrates communication path information according to the exemplary embodiment.

FIG. 10 is a block diagram illustrating an overall configuration of a network access control system disclosed in Patent Literature 1.

FIG. 11 is a block diagram illustrating a configuration of the network access control system disclosed in Patent Literature 1.

FIG. 12 illustrates communication path information in the network access control system disclosed in Patent Literature 1.

PREFERRED MODES

Figure 1:
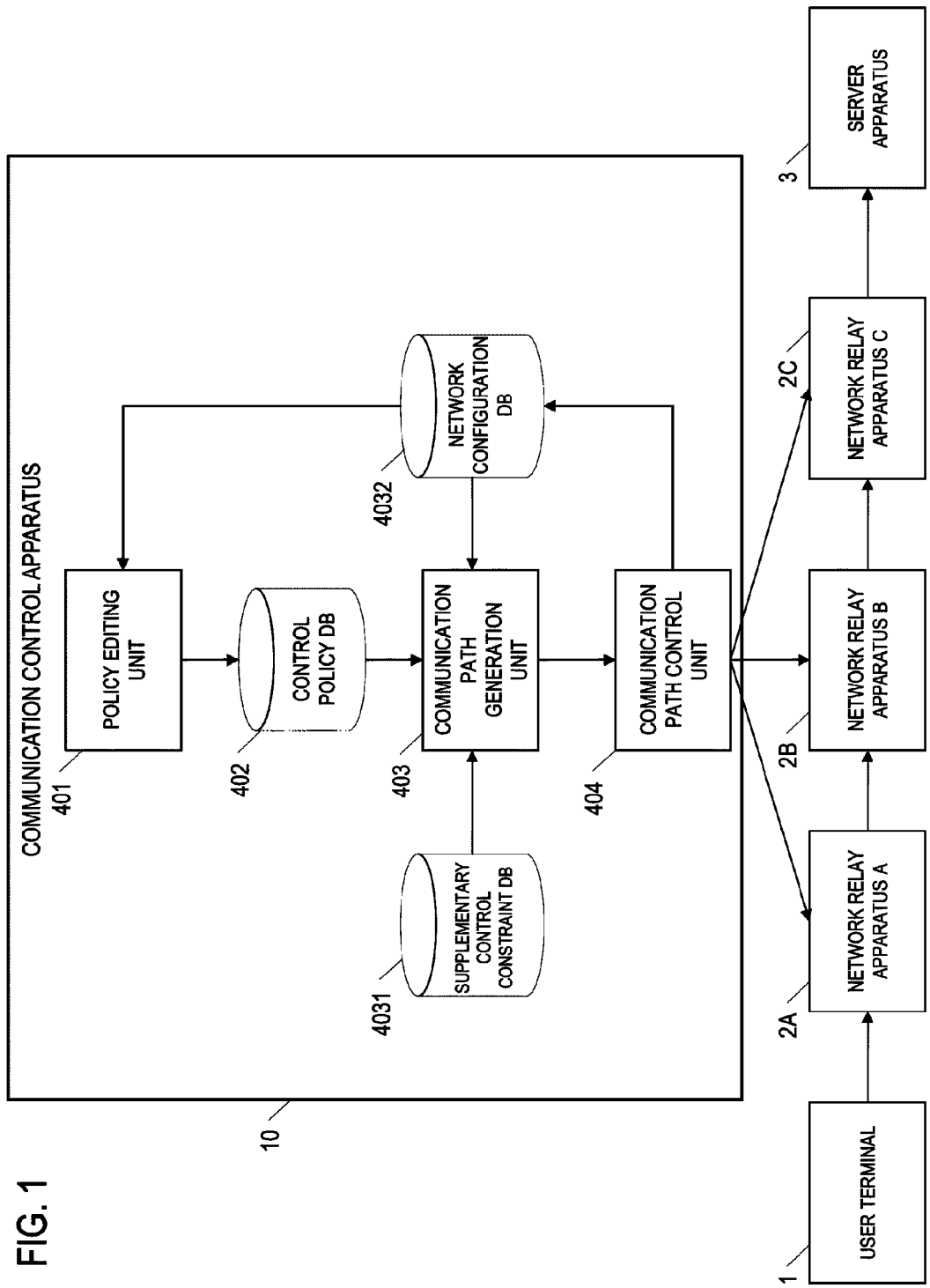
FIG. 1 is a block diagram illustrating a configuration of a network access control system (communication system) including a communication control apparatus according to an exemplary embodiment.

In the present disclosure, there are various possible modes, which include the following, but not restricted thereto. First, an outline of the present invention will be described. In the following outline, the reference characters are merely used as examples to facilitate understanding of the present invention. Thus, the reference characters are not intended to limit the present invention to the illustrated modes.

As illustrated in FIG. 1, a communication control apparatus (10) according to the present invention is a communication control apparatus controlling communication between a first apparatus (for example, a user terminal 1) and a second apparatus (for example, a server apparatus 3) connected to the first apparatus via a plurality of relay apparatuses (for example, network relay apparatuses 2A to 2C). The communication control apparatus comprises: a communication path generation unit (403) that refers to a control policy (see FIG. 3) including access control and supplementary control that is other than the access control from the first apparatus to the second apparatus and refers to network configuration information about a network configuration among the first apparatus, the second apparatus, and the plurality of relay apparatuses and generates a communication path that matches the control policy from the first apparatus to the second apparatus and goes through at least one of the plurality of relay apparatuses; and a communication path control unit (404) that instructs a relay apparatus(es) on the communication path among the plurality of relay apparatuses to execute the access control and the supplementary control included in the control policy.

Figure 9:
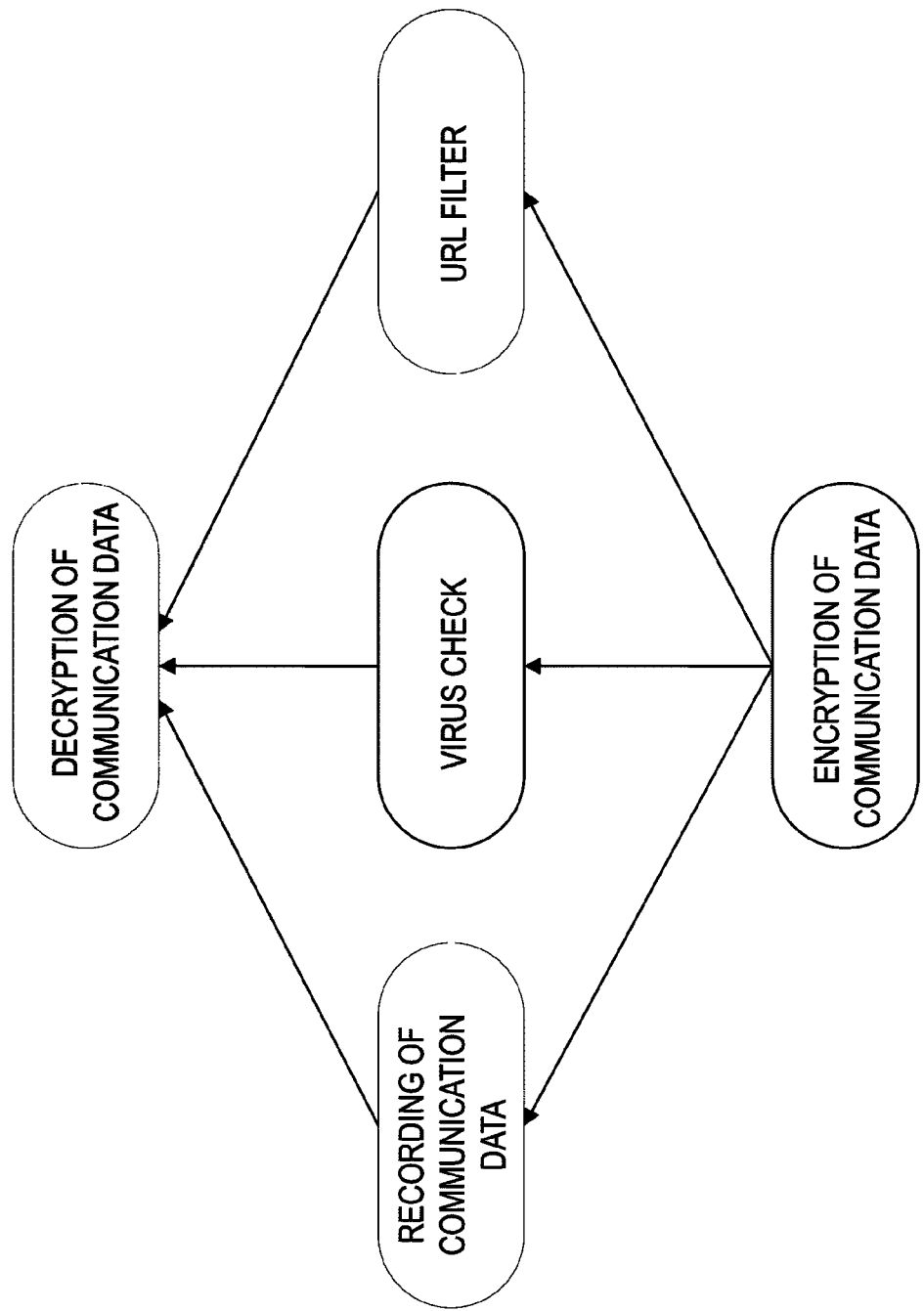
FIG. 9 illustrates a data structure in a supplementary control constraint DB in the communication control apparatus according to the exemplary embodiment.

As illustrated in FIG. 9, the control policy may include a plurality of items of supplementary control on which a constraint on an execution order is imposed, and the communication path generation unit (403) may generate the communication path satisfying the constraint. Namely, the control policy may include first supplementary control (for example, decryption of communication data) and second supplementary control (recording of communication data) that needs to be executed after the first supplementary control. The plurality of relay apparatuses may include a first relay apparatus executing the first supplementary control and a second relay apparatus executing the second supplementary control. The communication path generation unit (403) may generate the communication path so that data flows through the second relay apparatus after flowing through the first relay apparatus.

In addition, if a plurality of communication paths match the control policy, the communication path generation unit (403) may select a communication path having a shortest path length from the plurality of communication paths. Alternatively, if a plurality of communication paths match the control policy, the communication path generation unit (403) may select a communication path having a largest minimum bandwidth from the plurality of communication paths.

Figure 3:
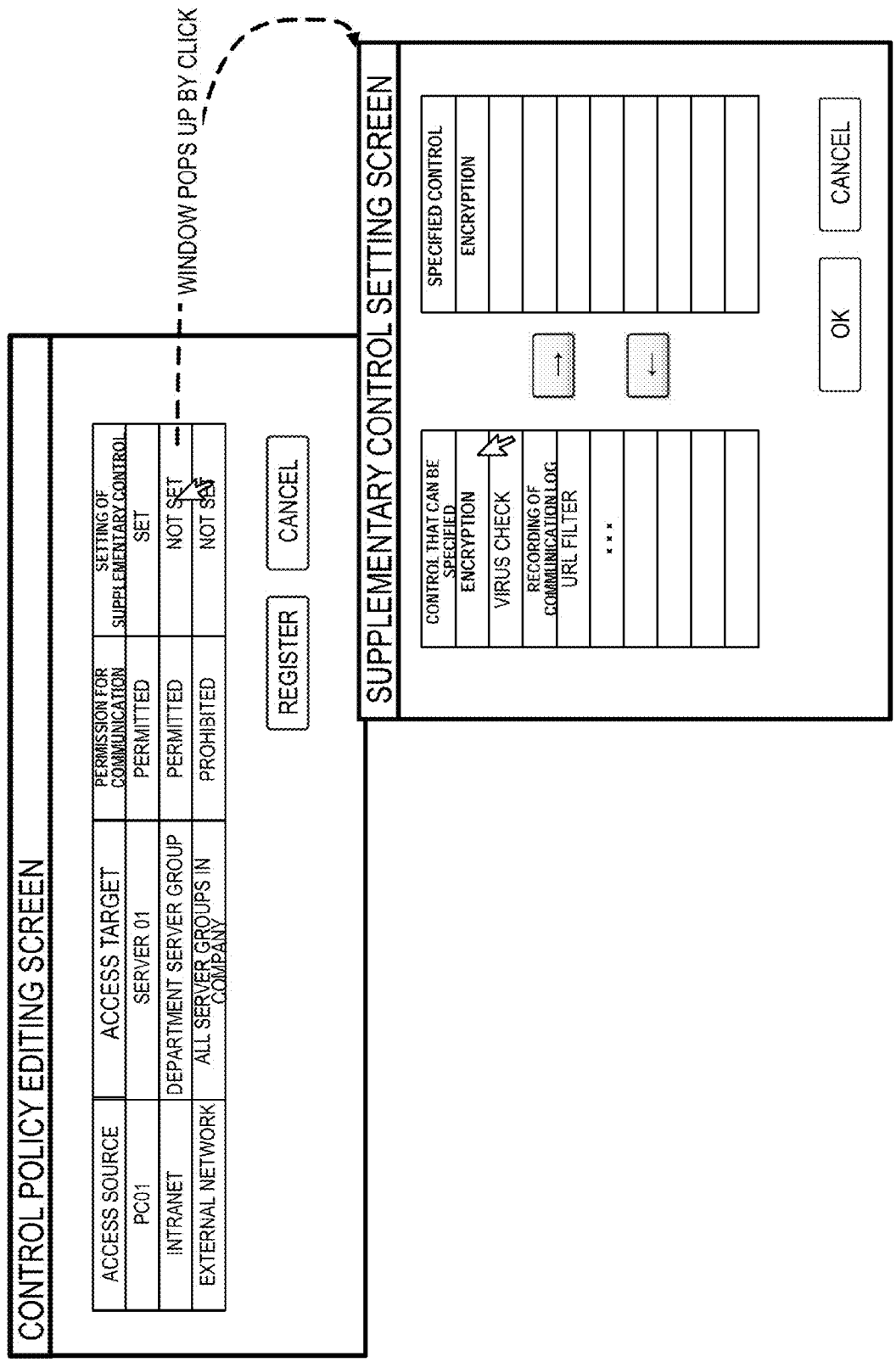
FIG. 3 illustrates a control policy editing operation by a policy editing unit in the communication control apparatus according to the exemplary embodiment.

As illustrated in FIGS. 3 and 9, the supplementary control included in the control policy may include at least one of checking of communication data, recording of communication data, encryption of communication data, and decryption of communication data.

With the communication control apparatus (10) according to the present invention, in a network access control system controlling communication based on a combination of a user (or a user terminal) and a communication destination server (or a communication destination domain), supplementary control on check rules for IP packet payload, storage of communication records, and so forth can be described, a network relay apparatus is selected so that the supplementary control is executed, and a communication path can be generated automatically. Namely, according to the present invention, in addition to access permission control, more advanced security control such as virus check, encryption, or log recording of communication data can be executed automatically.

This is because the communication path generation unit generates and sets communication path information including network relay apparatuses such as a firewall apparatus, a virus check apparatus, an encryption apparatus, and a log recording apparatus so that supplementary control on virus check, encryption, log recording, and so forth, which requires checking and processing payload, can be executed simultaneously with access control on access permission, which can be determined simply by checking a packet header.

According to the present invention, the following modes are possible.

(Mode 1)

A communication control apparatus may be the communication control apparatus according to the above first aspect.

(Mode 2)

The control policy may include a plurality of items of supplementary control on which a constraint on an execution order is imposed. The communication path generation unit may generate the communication path satisfying the constraint.

(Mode 3)

The control policy may include first supplementary control and second supplementary control that needs to be executed after the first supplementary control. The plurality of relay apparatuses may include a first relay apparatus executing the first supplementary control and a second relay apparatus executing the second supplementary control. The communication path generation unit may generate the communication path so that data flows through the second relay apparatus after flowing through the first relay apparatus.

(Mode 4)

If a plurality of communication paths match the control policy, the communication path generation unit may select a communication path having a shortest path length from the plurality of communication paths.

(Mode 5)

If a plurality of communication paths match the control policy, the communication path generation unit may select a communication path having a largest minimum bandwidth from the plurality of communication paths.

(Mode 6)

The supplementary control included in the control policy may include at least one of checking of communication data, recording of communication data, encryption of communication data, and decryption of communication data.

(Mode 7)

There is provided a communication system comprising the communication control apparatus and the plurality of relay apparatuses controlled by the communication control apparatus.

(Mode 8)

A communication control method may be the communication control method according to the above second aspect.

(Mode 9)

In the above communication control method, the control policy may include a plurality of items of supplementary control on which a constraint on an execution order is imposed. In the communication path generation step, the communication path satisfying the constraint may be generated.

(Mode 10)

In the above communication control method, the control policy may include first supplementary control and second supplementary control that needs to be executed after the first supplementary control. The plurality of relay apparatuses may include a first relay apparatus executing the first supplementary control and a second relay apparatus executing the second supplementary control. The generation may comprise generating the communication path so that data flows through the second relay apparatus after flowing through the first relay apparatus.

(Mode 11)

The generating may comprise selecting a communication path having a shortest path length from a plurality of communication paths matching the control policy.

(Mode 12)

The generating may comprise selecting a communication path having a largest minimum bandwidth from a plurality of communication paths matching the control policy.

(Mode 13)

In the above communication control method, the supplementary control included in the control policy may include at least one of checking of communication data, recording of communication data, encryption of communication data, and decryption of communication data.

(Mode 14)

A program may be the program according to the above third aspect.

(Mode 15)

In the above program, the control policy may include a plurality of items of supplementary control on which a constraint on an execution order is imposed. The generation may comprise generating the communication path satisfying the constraint.

(Mode 16)

In the above program, the control policy may include first supplementary control and second supplementary control that needs to be executed after the first supplementary control. The plurality of relay apparatuses may include a first relay apparatus executing the first supplementary control and a second relay apparatus executing the second supplementary control. The generating may comprise generating the communication path so that data flows through the second relay apparatus after flowing through the first relay apparatus.

(Mode 17)

The generation may comprise selecting a communication path having a shortest path length from a plurality of communication paths matching the control policy.

(Mode 18)

The generating may comprise selecting a communication path having a largest minimum bandwidth from a plurality of communication paths matching the control policy.

(Mode 19)

In the above program, the supplementary control included in the control policy may include at least one of checking of communication data, recording of communication data, encryption of communication data, and decryption of communication data.

Exemplary Embodiment

Next, a communication control apparatus according to an exemplary embodiment will be described in detail with reference to the drawings. FIG. 1 is a block diagram illustrating a configuration of a network access control system (communication system) including a communication control apparatus according to the present exemplary embodiment.

As illustrated in FIG. 1, the network access control system includes a communication control apparatus 10, a user terminal 1, network relay apparatuses 2A to 2C, and a server apparatus 3. The communication control apparatus 10 includes a policy editing unit 401, a control policy DB (Database) 402, a communication path generation unit 403, a network configuration DB 4032, a supplementary control constraint DB 4031, and a communication path control unit 404.

As illustrated in FIG. 1, the network access control system includes a plurality of network nodes such as the user terminal 1, the network relay apparatuses 2, and the server apparatus 3.

The policy editing unit 401 outputs a control policy in which supplementary control on checking of communication data (payload), recording of a communication log, and the like is described in addition to access control including an access source, an access target, and an access type. The control policy DB 402 stores the control policy outputted from the policy editing unit 401.

The network configuration DB 4032 stores a physical configuration of the above plurality of network nodes and a logical configuration including current path information and so forth. The supplementary control constraint DB 4031 stores a constraint imposed on the order of execution of supplementary control as a supplementary control constraint.

The communication path generation unit 403 refers to the control policy stored in the control policy DB 402, the network configuration DB 4032, and the supplementary control constraint DB 4031 and generates communication path information matching the control policy. The communication path control unit 404 gives path change instructions to the above plurality of network nodes, based on the communication path information generated by the communication path generation unit 403.

In addition, when the communication path generation unit 403 refers to the above access control and the network configuration DB 4032, if the communication path generation unit 403 extracts a plurality of communication path candidates from an access source to an access target, the communication path generation unit 403 may select a single communication path satisfying the supplementary control and the supplementary control constraint from the plurality of candidates and output the selected communication path to the communication path control unit 404 as communication path information. Based on the communication path information outputted from the communication path control unit 403, the communication path control unit 404 sets a communication path matching the control policy in a plurality of network relay apparatuses.

Figure 2:
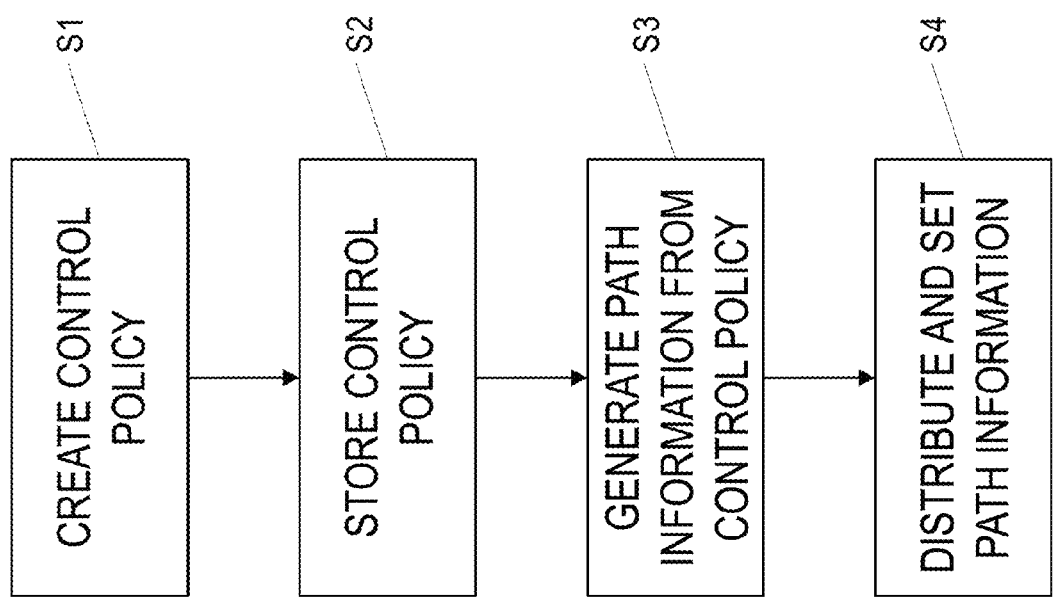
FIG. 2 is a flow chart illustrating an operation of the communication control apparatus according to the exemplary embodiment.

FIG. 2 is a flow chart illustrating an operation of the communication control apparatus 10 according to the present exemplary embodiment. An operation of the communication control apparatus 10 will be described in detail with reference to the flow chart in FIG. 2.

First, a security manager, who is a user of the access control system, inputs a control policy regarding a combination of the user terminal 1 of the user and the server apparatus 3 to the policy editing unit 401 (step S1).

FIG. 3 illustrates a specific example of the control policy editing operation by the policy editing unit 401. In addition to access control including an access source, an access target, and an access type, the user can specify supplementary control as a control policy, via a GUI (Graphical User Interface) as illustrated in FIG. 3. As illustrated in FIG. 3, supplementary control such as on encryption and recording of a communication log that can be used by the network relay apparatuses 2A to 2C and that needs to be executed on communication data matching access control is selected and specified.

The inputted control policy is stored in the control policy DB 402 (step S2). The control policy may be stored in the control policy DB 402 in an arbitrary format such as in XACML (eXtensible Access Control Markup Language).

Figure 4:
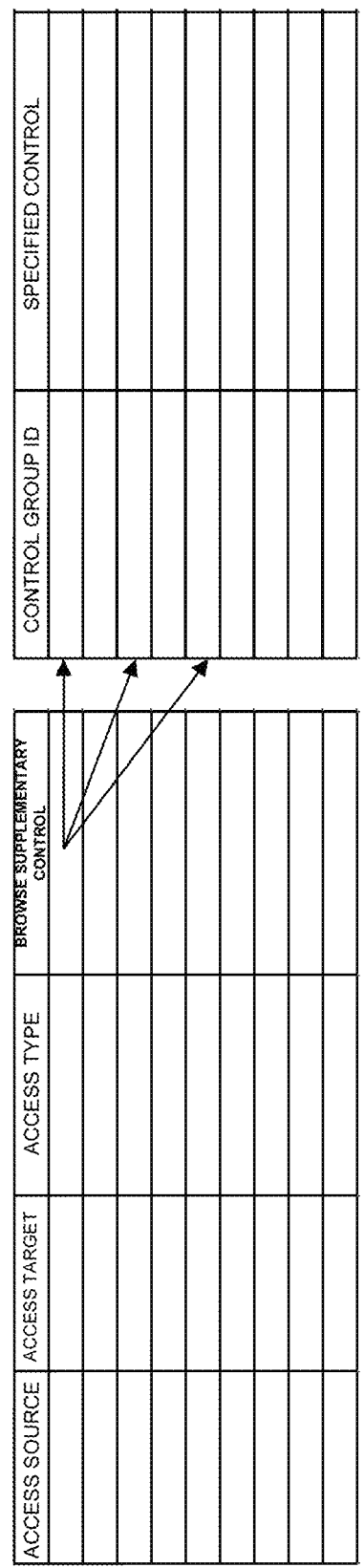
FIG. 4 illustrates a control policy storage format of a control policy DB in the communication control apparatus according to the exemplary embodiment.

FIG. 4 illustrates a control policy storage format in the control policy DB 402. As illustrated in FIG. 4, in a preferable control policy storage format, a plurality of items of supplementary control can be associated with access control including an access source, an access target, and an access type. This is because a plurality of items of supplementary control could be specified for a single item of access control and because supplementary control is changed more frequently, for example, when the network relay apparatuses 2A to 2C are changed or when a new network relay apparatus is added, as compared with access control.

Next, the communication path generation unit 403 reads the control policy stored in the control policy DB 402, refers to the supplementary control constraint DB 4031 and the network configuration DB 4032, and generates communication path information (step S3).

Figure 5:
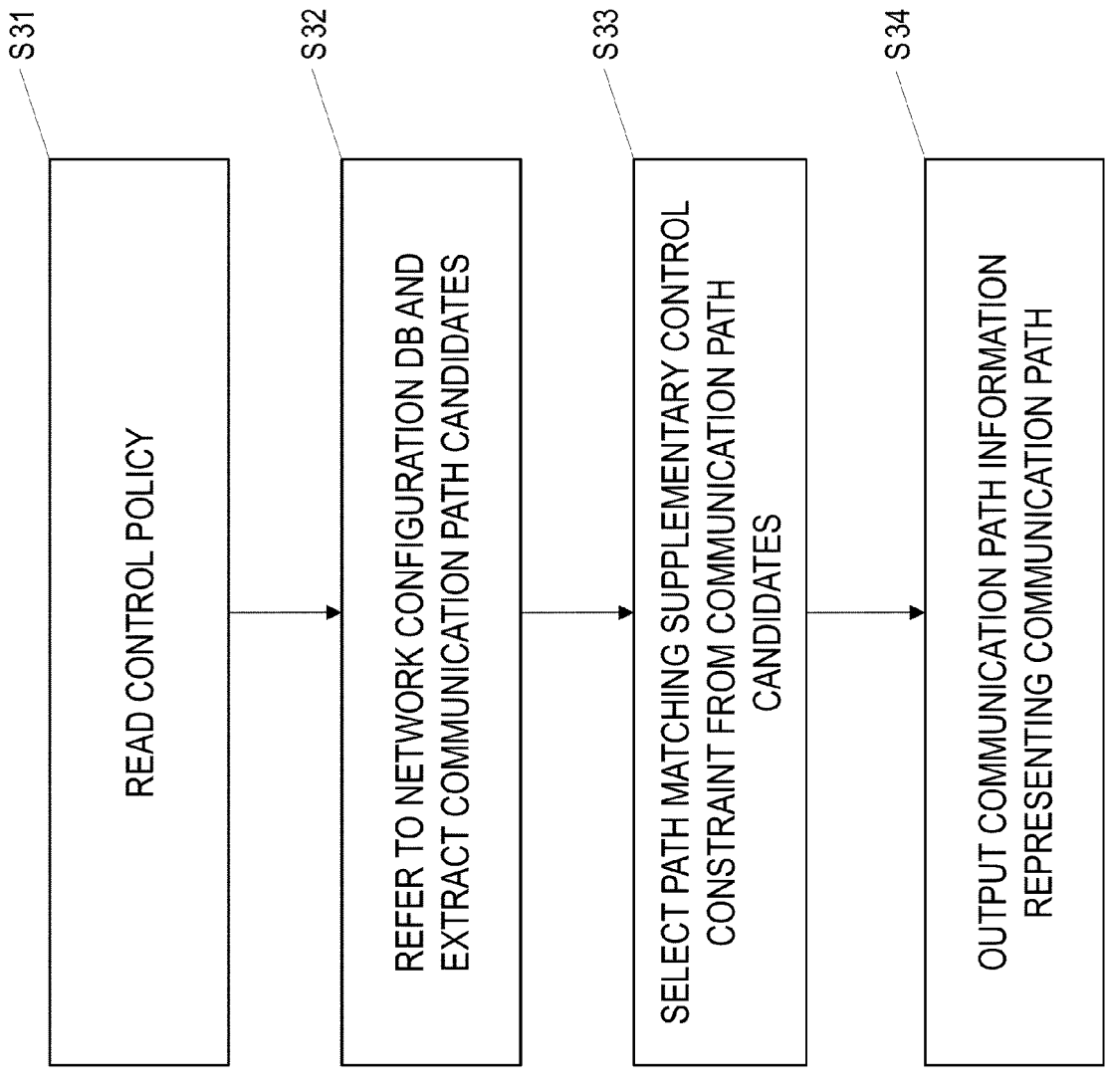
FIG. 5 is a flow chart illustrating a detailed operation by a communication path generation unit in the communication control apparatus according to the exemplary embodiment.

FIG. 5 is a flow chart illustrating a procedure for generating communication path information by the communication path generation unit 403. As illustrated in FIG. 5, the communication path generation unit 403 reads the control policy stored in the control policy DB 402 (step S31). The policy to be read may be selected by using an arbitrary method such as by using a batch script or by using a command line.

FIG. 6 illustrates a screen for editing a control policy distribution schedule. By using the distribution schedule setting GUI as illustrated in FIG. 6, a policy may be automatically read at certain times.

Next, the communication path generation unit 403 refers to the network configuration DB 4032, searches for all communication paths on which the user terminal 1, which is the access source specified by the access control of this control policy, can access the access target server apparatus 3, and extracts communication path candidates (step S32). In the network configuration DB 4032, a physical or logical network configuration of all the control target nodes, that is, the user terminal 1, the network relay apparatuses 2A to 2C, and the server apparatus 3, is stored in a graph (hereinafter referred to as "network configuration graph").

Figure 7:
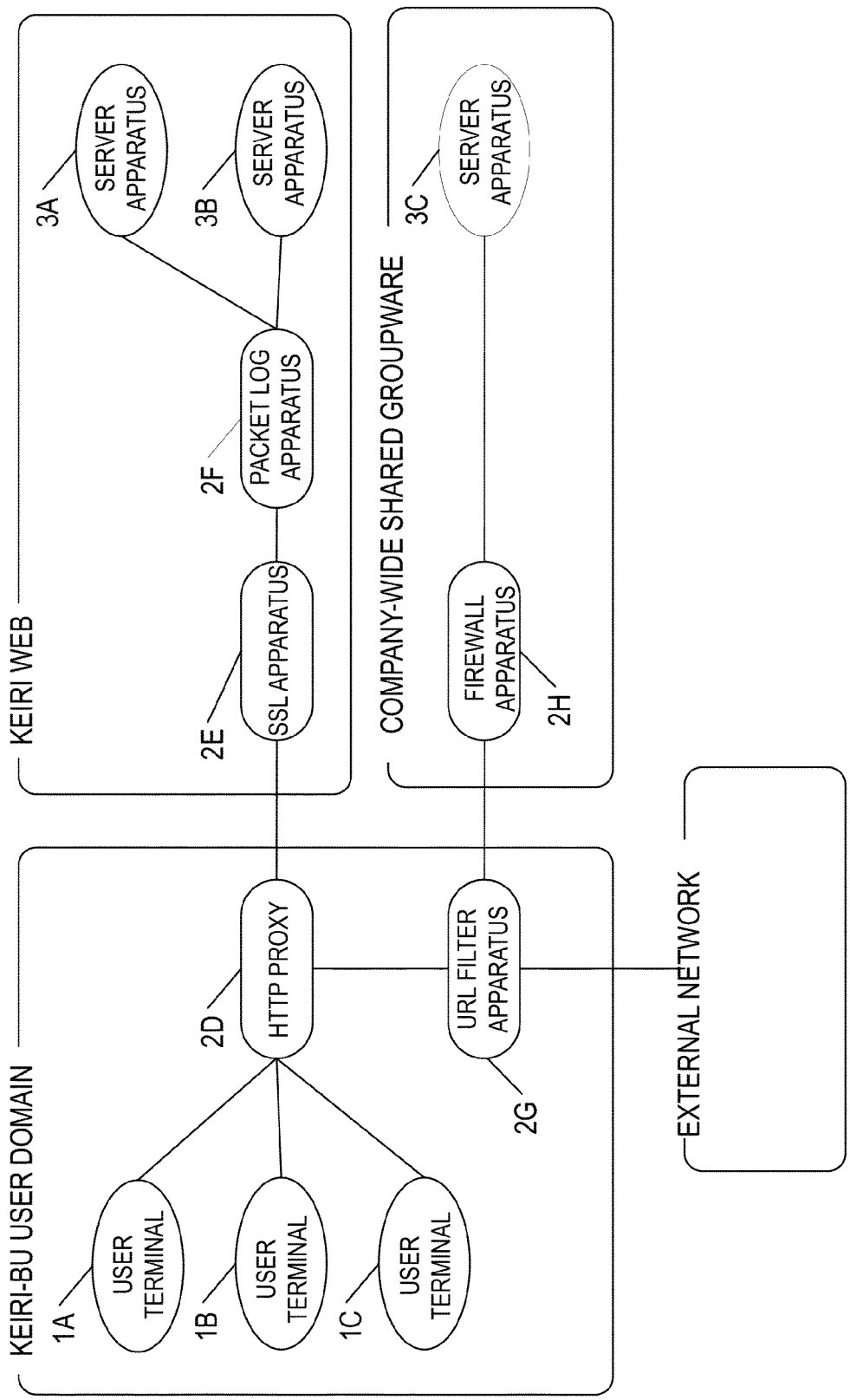
FIG. 7 illustrates a network configuration graph stored in a network configuration DB in the communication control apparatus according to the exemplary embodiment.

FIG. 7 illustrates a network configuration graph stored in the network configuration DB 4032. FIG. 7 illustrates a network configuration including user terminals 1A to 1C, network relay apparatuses such as an HTTP (Hypertext Transfer Protocol) proxy 2D, an SSL (Secure Socket Layer) apparatus 2E, a packet log apparatus 2F, a URL (Uniform Resource Locator) filter apparatus 2G, and a firewall apparatus 2H, and server apparatuses 3A to 3C arranged in a Keiri-bu (accounting department) user domain, a Keiri (accounting) Web, and company-wide shared groupware.

The communication path generation unit 403 scans this network configuration graph, extracts a subgraph including the user terminal 1 as the start point and the server apparatus 3 as the end point, and extracts the subgraph for selecting communication path candidates.

Next, the communication path generation unit 403 refers to the supplementary control constraint DB 4031 and the supplementary control specified by the above control policy and selects a communication path, on which the supplementary control can be executed, from the communication path candidates (step S33).

FIG. 8 illustrates communication path information. As illustrated in FIG. 8, the communication path information is set per network relay apparatus identifier (relay apparatus identifier). For example, an item of communication path information includes: a combination of an access source domain, an access target domain, and a protocol (access type), which correspond to access control; a command for executing supplementary control corresponding to this network relay apparatus; and an identifier of a network relay apparatus, which is the next forwarding destination of this network relay apparatus. As will be described below, the relay apparatus identifier is an identifier used for distributing communication path information from the communication path control unit 404 to a network relay apparatus. If a management network including the communication path control unit 404 and the network relay apparatuses has been established, for example, the IP addresses of the network relay apparatuses on the management network may be used as the relay apparatus identifiers.

The supplementary control constraint DB 4031 stores information about a constraint imposed on the order of execution of supplementary control. For example, if "decryption of communication data" executed by an SSL (Secure Socket Layer) apparatus or the like and "recording of communication data" executed by a packet log apparatus or the like are specified as supplementary control in a control policy, generally, decryption of communication data needs to be executed before recording of a packet log. This is because, if recording of communication data is executed first, encrypted communication data is recorded as a packet log. In this way, a useful log cannot be obtained. Thus, for example, the supplementary control constraint DB 4031 stores a directed graph representing an order relation of the individual items of supplementary control.

FIG. 9 illustrates a data structure in the supplementary control constraint DB 4031. The communication path generation unit 403 scans this directed graph and arranges the specified supplementary control items in an executable order. As illustrated in FIG. 9, no order relation may be defined among some of the supplementary control items. Namely, the supplementary control constraint may have a semi-order relation.

The communication path generation unit 403 scans the subgraph including the communication path candidates and determines a path including the network relay apparatuses 2 in the order corresponding to the arranged supplementary control. If a plurality of paths match the same condition, various methods may be used to narrow down the paths. For example, a path having the shortest path length may be selected to improve communication performance. Alternatively, if the above network configuration graph is provided with path bandwidth information, a path having a largest minimum bandwidth may be selected so as to ensure the end-to-end bandwidth.

Next, the communication path generation unit 403 outputs the generated communication path information to the communication path control unit 404 (step S34).

When receiving the communication path information from the communication path generation unit 403, the communication path control unit 404 distributes and sets the setting information about the network relay apparatuses 2 included in the communication path information to and in the respective network relay apparatuses 2 (step S4 in FIG. 2).

Next, an advantageous effect provided by the communication control apparatus 10 according to the present exemplary embodiment will be described. The communication path generation unit 403 converts a control policy including supplementary control into communication path information including network relay nodes 2 executing the supplementary control and distributes and sets the communication path information to and in the network relay nodes 2. In this way, encryption of communication data, recording of a log, and so forth can be executed, based on a combination of an access source and an access target specified in the control policy.

For example, the present invention is applicable to encryption, checking, and log recording of communication data, as part of the information security measures in a network system such as a data center or a corporate intranet.

The disclosure of prior art including the above Patent Literature and the like is incorporated herein by reference thereto. Modifications and adjustments of the exemplary embodiment are possible within the scope of the overall disclosure (including the claims) of the present invention and based on the basic technical concept of the present invention. Various combinations and selections of various disclosed elements (including the elements in each claim, exemplary embodiment, drawings, etc.) are possible within the scope of the claims of the present invention. That is, the present invention of course includes various variations and modifications that could be made by those skilled in the art according to the overall disclosure including the claims and the technical concept.

1, 1A to 1C user terminal
2A to 2C network relay apparatus
2D HTTP proxy
2E SSL apparatus
2F packet log apparatus
2G URL filter apparatus
2H firewall apparatus
3, 3A to 3C server apparatus
10 communication control apparatus
301 firewall server apparatus
302 directory server apparatus
401 policy editing unit
402 control policy DB
403 communication path generation unit
404 communication path control unit
412 data relay control program
413 directory information synchronization program 414 relay path table
4031 supplementary control constraint DB
4032 network configuration DB

The invention claimed is:

1. A communication control apparatus, controlling communication between a first apparatus and a second apparatus connected to the first apparatus via a plurality of relay apparatuses, the communication control apparatus comprising:
a processor communicatively coupled to the first apparatus and the second apparatus, wherein the processor is configured to execute program instructions that cause the processor to:
refer to a control policy including access control and supplementary control that is other than the access control from the first apparatus to the second apparatus and refers to network configuration information about a network configuration among the first apparatus, the second apparatus, and the plurality of relay apparatuses;
generate a communication path that matches the control policy from the first apparatus to the second apparatus and goes through at least one of the plurality of relay apparatuses; and
instruct one or more of the relay apparatuses on the communication path among the plurality of relay apparatuses to execute the access control and the supplementary control included in the control policy,
wherein the supplementary control of the control policy includes first supplementary control and second supplementary control that need to be executed after the first supplementary control,
wherein the plurality of relay apparatuses include a first relay apparatus executing the first supplementary control and a second relay apparatus executing the second supplementary control; and
wherein the processor generates the communication path so that data flows through the second relay apparatus after flowing through the first relay apparatus.

2. The communication control apparatus according to claim 1;
wherein, if a plurality of communication paths match the control policy, the processor selects a communication path having a shortest path length from the plurality of communication paths.

3. The communication control apparatus according to claim 1;
wherein, if a plurality of communication paths match the control policy, the processor selects a communication path having a largest minimum bandwidth from the plurality of communication paths.

4. The communication control apparatus according to claim 1;
wherein the supplementary control included in the control policy includes at least one of checking of communication data, recording of communication data, encryption of communication data, and decryption of communication data.

5. A communication system, comprising:
the communication control apparatus according to claim 1; and
the plurality of relay apparatuses controlled by the communication control apparatus.

6. A communication control method, comprising:
by a communication control apparatus that controls communication between a first apparatus and a second apparatus connected to the first apparatus via a plurality of relay apparatuses, referring to a control policy including access control supplementary control that is other than the access control from the first apparatus to the second apparatus and network configuration information about a network configuration among the first apparatus, the second apparatus, and the plurality of relay apparatuses, wherein:
the supplementary control of the control policy includes first supplementary control and second supplementary control that need to be executed after the first supplementary control; and
the plurality of relay apparatuses include a first relay apparatus executing the first supplementary control and a second relay apparatus executing the second supplementary control;
generating a communication path that matches the control policy from the first apparatus to the second apparatus and goes through at least one of the plurality of relay apparatuses, wherein the generating comprises generating the communication path so that data flows through the second relay apparatus after flowing through the first relay apparatus; and
instructing one or more relay apparatuses on the communication path among the plurality of relay apparatuses to execute the access control and the supplementary control included in the control policy.

7. The communication control method according to claim 6;
wherein the generating comprises selecting a communication path having a shortest path length from a plurality of communication paths matching the control policy.

8. The communication control method according to claim 6;
wherein the generating comprises selecting a communication path having a largest minimum bandwidth from a plurality of communication paths matching the control policy.

9. The communication control method according to claim 6;
wherein the supplementary control included in the control policy includes at least one of checking of communication data, recording of communication data, encryption of communication data, and decryption of communication data.

10. A non-transitory computer-readable recording medium, storing a program that cause a computer to execute:
referring to a control policy DB that stores a control policy including access control and supplementary control that is other than the access control from a first apparatus to a second apparatus connected to the first apparatus via a plurality of relay apparatuses, and referring to a network configuration DB that stores network configuration information about a network configuration among the first apparatus, the second apparatus, and the plurality of relay apparatuses, wherein the supplementary control of the control policy includes first supplementary control and second supplementary control that needs to be executed after the first supplementary control and wherein the plurality of relay apparatuses include a first relay apparatus executing the first supplementary control and a second relay apparatus executing the second supplementary control;
generating a communication path that matches the control policy from the first apparatus to the second apparatus and goes through at least one of the plurality of relay apparatuses; and instructing one or more of the relay apparatuses on the communication path among the plurality of relay apparatuses to execute the access control and the supplementary control included in the control policy, wherein the generating comprises generating the communication path so that data flows through the second relay apparatus after flowing through the first relay apparatus.

11. The non-transitory computer-readable recording medium according to claim 10;
   wherein the generating comprises selecting a communication path having a shortest path length from a plurality of communication paths matching the control policy.

12. The non-transitory computer-readable recording medium according to claim 10;
   wherein the generating comprises selecting a communication path having a largest minimum bandwidth from a plurality of communication paths matching the control policy.

13. The non-transitory computer-readable recording medium program according to claim 10;
   wherein the supplementary control included in the control policy includes at least one of checking of communication data, recording of communication data, encryption of communication data, and decryption of communication data.

* * * * *